United States Patent
Krishnakumar et al.

(10) Patent No.: US 8,009,615 B2
(45) Date of Patent: Aug. 30, 2011

(54) MULTI-HOP AD-HOC WIRELESS NETWORKS THAT SUPPORT NON-MULTI-HOP WIRELESS TERMINALS

(75) Inventors: Anjur Sundaresan Krishnakumar, Rocky Hill, NJ (US); P. Krishnan, North Plainfield, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 885 days.

(21) Appl. No.: 11/937,902

(22) Filed: Nov. 9, 2007

(65) Prior Publication Data
US 2008/0112355 A1    May 15, 2008

Related U.S. Application Data

(60) Provisional application No. 60/865,132, filed on Nov. 9, 2006.

(51) Int. Cl.
H04W 4/00 (2009.01)
H04L 12/28 (2006.01)
H04L 12/56 (2006.01)

(52) U.S. Cl. ........................ 370/328; 370/392
(58) Field of Classification Search .................. 370/328, 370/389, 392
See application file for complete search history.

(56) References Cited

U.S. PATENT DOCUMENTS

| | | |
|---|---|---|
| 6,691,169 B1 | 2/2004 | D'Souza |
| 6,961,310 B2 | 11/2005 | Cain |
| 7,002,924 B2 | 2/2006 | Braun et al. |
| 7,197,326 B2 | 3/2007 | Acampora |
| 7,200,149 B1 | 4/2007 | Hasty, Jr. |
| 7,330,694 B2 | 2/2008 | Lee et al. |
| 7,379,447 B2 | 5/2008 | Dunagan et al. |
| 7,388,869 B2 | 6/2008 | Butehorn et al. |

(Continued)

FOREIGN PATENT DOCUMENTS

| | | | |
|---|---|---|---|
| WO | WO 2006/000239 | * | 1/2006 |
| WO | 2006098723 A1 | | 9/2006 |

OTHER PUBLICATIONS

Sameh Gobriel, Daniel Mosse, Rami Melhem, "Mitigating the Flooding Waves Problem in Energy-Efficient Routing for MANETs", in Proceedings of the IEEE International Conference on Distributed Computing Systems, Lisbon Portugal, Jul. 4-7, 2006.

(Continued)

*Primary Examiner* — Ronald Abelson
(74) *Attorney, Agent, or Firm* — Maldjian Law Group LLC; John P. Maldjian (57) ABSTRACT

An apparatus and methods are disclosed that enable a non-multi-hop wireless terminal (i.e., a wireless terminal that has not been programmed to participate in multi-hop ad-hoc wireless networks) to in fact participate in a multi-hop ad-hoc wireless network, without any changes to the non-multi-hop terminal's software or hardware. In the illustrative embodiment, a wireless terminal T that already belongs to a multi-hop ad-hoc wireless network is assigned to a non-multi-hop wireless terminal W, and a signal is transmitted to terminal W that induces terminal W to use terminal T as a relay for transmitting messages. The assignment of multi-hop-capable terminals in the network to non-multi-hop terminals can be based on a variety of factors, such as signal strengths and the geo-locations of terminals.

18 Claims, 7 Drawing Sheets

U.S. PATENT DOCUMENTS

| | | | |
|---|---|---|---|
| 7,457,265 | B2 | 11/2008 | Julka et al. |
| 7,626,944 | B1 * | 12/2009 | Riddle .......................... 370/254 |
| 2002/0003780 | A1 | 1/2002 | Braun et al. |
| 2002/0069278 | A1 * | 6/2002 | Forslow ....................... 709/225 |
| 2004/0022223 | A1 | 2/2004 | Billhartz |
| 2004/0022224 | A1 | 2/2004 | Billhartz |
| 2004/0141511 | A1 | 7/2004 | Rune et al. |
| 2005/0030921 | A1 | 2/2005 | Yau |
| 2005/0053094 | A1 | 3/2005 | Cain et al. |
| 2005/0089041 | A1 * | 4/2005 | Idnani et al. .............. 370/395.5 |
| 2005/0089057 | A1 | 4/2005 | Kang et al. |
| 2005/0128958 | A1 | 6/2005 | Hamdan |
| 2005/0157697 | A1 | 7/2005 | Lee et al. |
| 2005/0165957 | A1 * | 7/2005 | Choi et al. .................... 709/238 |
| 2006/0109787 | A1 | 5/2006 | Strutt et al. |
| 2006/0250999 | A1 | 11/2006 | Zeng et al. |
| 2006/0293061 | A1 | 12/2006 | Kobayashi et al. |
| 2007/0008880 | A1 | 1/2007 | Buchko et al. |
| 2007/0184837 | A1 | 8/2007 | Hohl et al. |
| 2007/0192451 | A1 | 8/2007 | Tran et al. |
| 2008/0117823 | A1 | 5/2008 | Krishnakumar et al. |
| 2008/0170550 | A1 | 7/2008 | Liu et al. |
| 2008/0219154 | A1 | 9/2008 | Durrey |
| 2009/0207840 | A1 * | 8/2009 | McCanne ..................... 370/390 |
| 2010/0067398 | A1 | 3/2010 | Kutschenreuter |

OTHER PUBLICATIONS

Young, Steve R. "U.S. Appl. No. 11/937,911 Office Action Sep. 8, 2009" Publisher: USPTO, Published in: US.

Gobriel et al., "Load-Based Metrics and Flooding in Wireless Mesh Networks", "International Conference on Wireless Algorithms, Systems and Applications 2008", 2008, pp. 84-95, Publisher: Springer-Verlag Berlin Heidelberg.

Gobriel et al., "When a Long Way is not the Wrong Way", "WLAN Mesh Conference Paris 2007", Apr. 17-20, 2007.

Krishnakumar et al., "Project Raptor: Multi-hop Ad-hoc Wireless IP Telephony—System, Techniques and Issues".

Gobriel et al., "Self-Configuring Multi-hop Ad-hoc Wireless Telephony for Small Enterprises", "IEEE Wireless Communications & Networking Conference", Mar. 11-15, 2007.

Krishnakumar et al., "Supporting Legacy Devices in Multi-hop Ad-hoc Wireless Networks", "IEEE Global Communications Conference (GLOBECOM) 2008", Nov. 30-Feb. 4, 2008.

Gobriel et al., "When a Long Way is not the Wrong Way", "(Internal Avaya Labs document)", 2005, Publisher: Avaya Inc.

Wyllie, Christopher T., "U.S. Appl. No. 11/937,909 Office Action Dec. 2, 2009", Publisher: USPTO, Published in: US.

Wyllie, Christopher T., "US Appl. No. 11/937,909 Office Action Jun. 10, 2010" Publisher: USPTO, Published in: US.

Young, Steve R., "U.S. Appl. No. 11/937,909 Office Action Mar. 26, 2010" Publisher: USPTO, Published in: US.

Wyllie, Christopher T., "U.S. Appl. No. 11/937,909 Notice of Allowance Jul. 26, 2010" Publisher: USPTO, Published in: US.

Young, Steve R., "U.S. Appl. No. 11/937,911 Office Action Feb. 18, 2011",. Publisher: USPTO, Published in: US.

* cited by examiner

MULTI-HOP AD-HOC WIRELESS NETWORKS THAT SUPPORT NON-MULTI-HOP WIRELESS TERMINALS

CROSS-REFERENCE TO RELATED APPLICATIONS

This application claims the benefit of U.S. provisional application Ser. No. 60/865,132, filed Nov. 9, 2006, entitled "Multi-Hop Ad-Hoc Wireless IP Telephony,", which is also incorporated by reference.

FIELD OF THE INVENTION

The present invention relates to telecommunications in general, and, more particularly, to multi-hop ad-hoc wireless networks.

BACKGROUND OF THE INVENTION

In a wireless ad-hoc network, nodes (e.g., wireless telecommunications terminals, etc.) communicate with each other via a mesh topology without a central access point or server. The term ad-hoc reflects the fact that nodes can form networks "on the fly" without any supporting networking infrastructure, as well as the fact that the mobility of nodes can result in frequent changes in network membership and topology.

Figure 1:
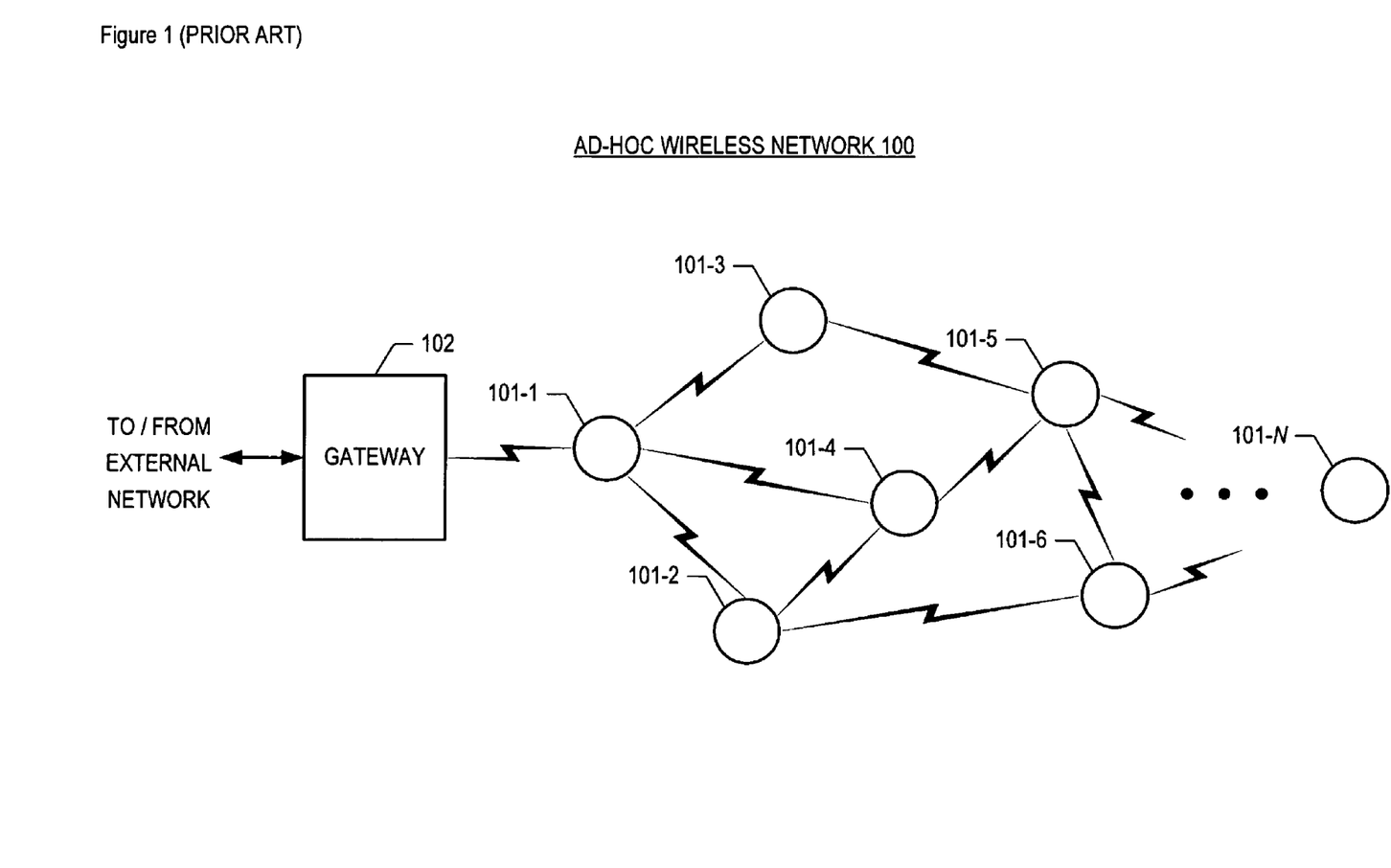
FIG. 1 depicts the salient elements of illustrative ad-hoc wireless network 100, in accordance with the prior art.

FIG. 1 depicts the salient elements of illustrative ad-hoc wireless network 100 in accordance with the prior art. As shown in FIG. 1, wireless network 100 comprises nodes 101-1 through 101-N, where N is an integer greater than one, and gateway 102, with wireless communication links between these elements indicated by "lightning bolts." Nodes 101-1 through 101-N are capable of transmitting and receiving messages in point-to-point fashion via the wireless communication links, either between two nodes 101-*i* and 101-*j*, or between a node 101-*i* and gateway 102.

Gateway 102 is capable of receiving messages that originate from outside of wireless network 100, and of transmitting these messages to one or more of nodes 101-1 through 101-N. Gateway 102 is also capable of receiving messages that originate from any of nodes 101-1 through 101-N, and of transmitting these messages to one or more destinations outside of wireless network 100. As will be appreciated by those skilled in the art, gateway 102 is an unnecessary element of network 100 when nodes 101-1 through 101-N communicate only among themselves.

Nodes 101-1 through 101-N and gateway 102 typically communicate via any of a variety of wireless communications protocols, such as one of the Institute of Electrical and Electronics Engineers (IEEE) 802.11 family of protocols in ad-hoc mode (as opposed to the more-common infrastructure mode), the Bluetooth short-range wireless protocol, etc.

When nodes 101-1 through 101-N and gateway 102 are capable of transmitting and receiving messages via a path comprising two or more wireless communication links (or "hops"), network 100 is said to be a multi-hop ad-hoc wireless network. In a multi-hop ad-hoc wireless network, a routing protocol guides the delivery of messages throughout the network.

Routing protocols can generally be classified into two categories: proactive, and reactive. Proactive routing protocols, such as Destination-Sequenced Distance-Vector (DSDV) routing, try to maintain correct routing information at all nodes in the network at all times. Proactive protocols are typically table-driven, with topology changes handled through periodic broadcast of routing table updates.

In contrast, reactive (or on-demand) routing protocols, such as Ad-hoc On-Demand Distance Vector (AODV) routing, Optimized Link State Routing (OLSR), and Dynamic Source Routing (DSR), obtain a route only when needed. Reactive routing protocols typically can support rapid rates of node mobility and frequent topology changes, but suffer from a larger route-setup overhead than proactive routing protocols. Proactive routing protocols, meanwhile, are either slow to respond to dynamism in the network, or require significant bandwidth overhead to maintain up-to-date routes.

Multi-hop wireless ad-hoc networks are advantageous in that they typically cost less to deploy and maintain than other types of networks, as they eliminate the need for access points or servers, and require little or no configuration. Moreover, multi-hop wireless ad-hoc networks are an attractive candidate for Voice over Internet Protocol (VoIP) telephony because they enable mobility and can reduce wiring costs in buildings.

A disadvantage of multi-hop wireless ad-hoc networks, however, is that they can be difficult to "scale up" to large numbers of nodes. Consequently, multi-hop ad-hoc wireless networks are typically most attractive for deployment in small and medium-size enterprises.

SUMMARY OF THE INVENTION

The present invention is based on the fact that a wireless telecommunications terminal is typically only able to participate in a multi-hop ad-hoc wireless network if it has been programmed to do so, and yet there are many wireless telecommunications terminals—both so-called "legacy" terminals as well as newer wireless terminals—that have not been so programmed. The illustrative embodiment of the present invention addresses this problem by enabling these non-multi-hop terminals to in fact participate in ad-hoc wireless networks, without any changes to these terminals' software or hardware. The illustrative embodiment therefore enables the deployment of ad-hoc wireless networks in which both multi-hop-capable terminals and non-multi-hop terminals can participate.

When one or more multi-hop-capable terminals in an existing ad-hoc wireless network detect a transmission by a non-multi-hop terminal W, one of the multi-hop-capable terminals T is "assigned" to terminal W, based on one or more of the following: the geo-location of non-multi-hop terminal W; the geo-locations of one or more of the multi-hop-capable terminals; the respective signal strengths with which multi-hop-capable terminals receive terminal W's transmission; and the signal strengths of multi-hop-capable terminals' transmissions as received at terminal W. In some embodiments, one or more multi-hop-capable terminals might "advertise" their interest in being assigned to terminal W, and terminal W selects one of these terminals. Alternatively, in some other embodiments the multi-hop-capable terminals might choose among themselves which is assigned to terminal W via a distributed election algorithm.

Following the assignment of multi-hop-capable terminal T to terminal W, a signal S is transmitted to terminal W that induces terminal W to use terminal T as a relay when terminal W subsequently transmits a message. In other words, after receiving signal S, when terminal W has a message to transmit, terminal W will transmit the message to terminal T for forwarding to the appropriate destination(s). In the illustrative embodiment, two mechanisms are advantageously employed for transmitting signal S in accordance with existing communication protocol techniques: "proxy ARPing", where ARP refers to the Address Resolution Protocol; and successive Dynamic Host Configuration Protocol (DHCP) messages with changing gateway addresses.

In the illustrative embodiment, when terminal W subsequently has a message to transmit that is directed to a different destination than that of its previously-transmitted messages, a different multi-hop-capable terminal in the network might be assigned to terminal W to act as a relay for messages transmitted from terminal W to this new destination. In addition, the assignment of terminals can change dynamically; perhaps in accordance with particular policies (e.g., review assignments after X seconds, etc.), or in response to changes in any of the following:
- the geo-locations of terminals,
- signal strengths, and
- the composition of the network (i.e., terminals joining or leaving the network).

The illustrative embodiment comprises: receiving at one or more of a plurality of wireless telecommunications terminals a first signal from a wireless telecommunications terminal W, wherein the plurality of wireless telecommunications terminals belong to the same ad-hoc wireless network and are capable of participating as intermediary nodes in multi-hop routes through the ad-hoc wireless network, and wherein the wireless telecommunications terminal W is incapable of participating as an intermediate node in a multi-hop route through the ad-hoc wireless network; and transmitting, in response to the first signal, a second signal to the wireless telecommunications terminal W from a wireless telecommunications T of the plurality of wireless telecommunications terminals, wherein the second signal induces the wireless telecommunications terminal W to use the wireless telecommunications terminal T as a relay for a first message that is subsequently transmitted by the wireless telecommunications terminal W.

DETAILED DESCRIPTION

Figure 2:
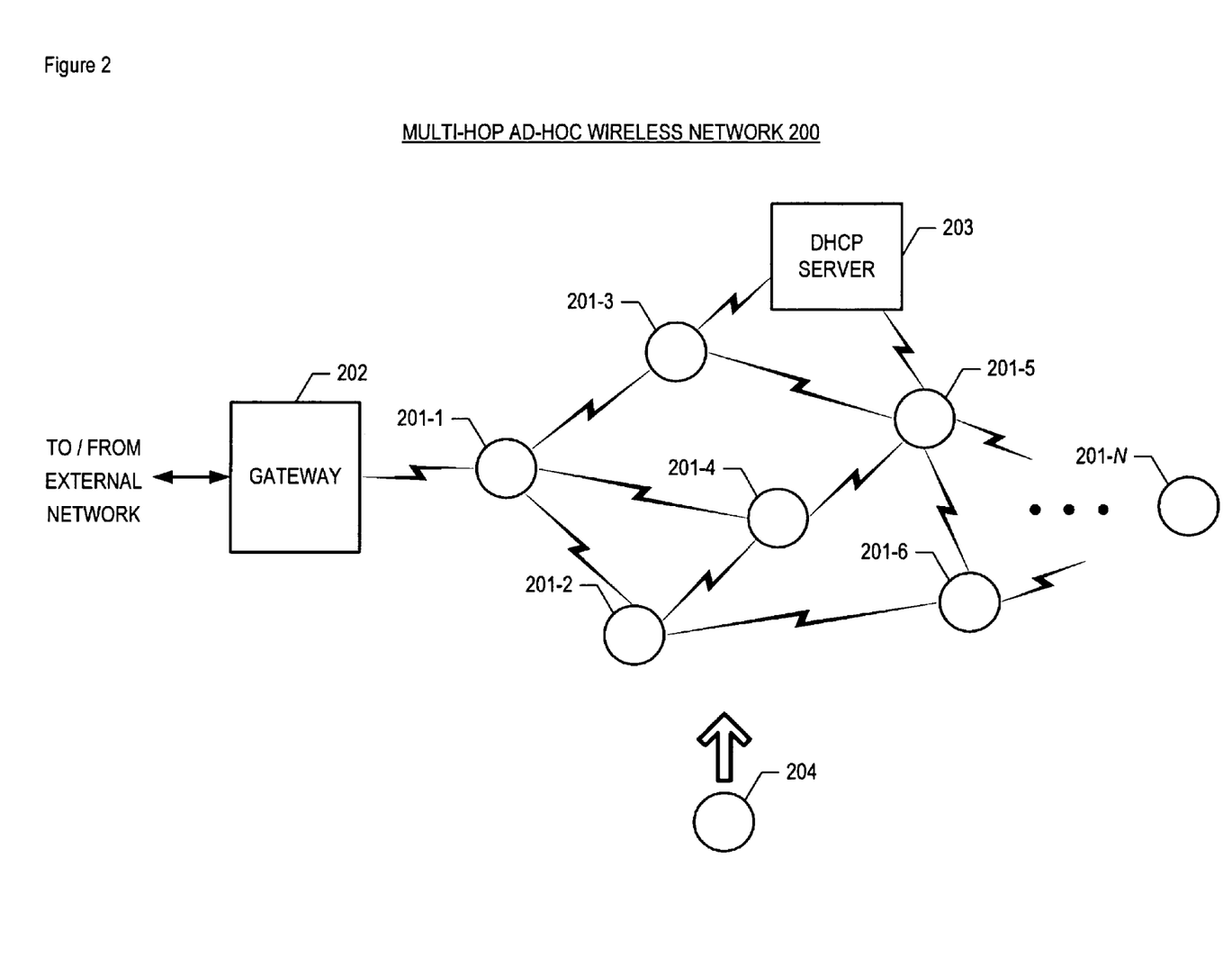
FIG. 2 depicts the salient elements of multi-hop ad-hoc wireless network 200, in accordance with the illustrative embodiment of the present invention.

FIG. 2 depicts the salient elements of multi-hop ad-hoc wireless network 200 in accordance with the illustrative embodiment of the present invention. As shown in FIG. 2, wireless network 200 comprises multi-hop-capable terminals 201-1 through 201-N, where N is an integer greater than one, gateway 202, Dynamic Host Configuration Protocol (DHCP) server 203, and non-multi-hop terminal 204, with wireless communication links between these elements indicated by "lightning bolts." Ad-hoc-capable terminals 201-1 through 201-N are wireless telecommunications terminals that are capable of transmitting and receiving messages in point-to-point fashion via the wireless communication links of network 200, as is well-known in the art. Moreover, each multi-hop-capable terminal 201-$i$ is capable of participating as an intermediate node in a multi-hop route through multi-hop ad-hoc wireless network 200.

Gateway 202 is capable of receiving messages that originate from outside of wireless network 200, and of transmitting these messages to one or more of terminals 201-1 through 201-N, in well-known fashion. Gateway 202 is also capable of receiving messages that originate from any of terminals 201-1 through 201-N, of transmitting these messages to one or more destinations outside of wireless network 200, and of participating in a multi-hop route in network 200.

As will be appreciated by those skilled in the art, in some other embodiments of the present invention gateway 202 might not be multi-hop-capable, and it will be clear to those skilled in the art, after reading this disclosure, how to make and use such embodiments. As will further be appreciated by those skilled in the art, in some other embodiments of the present invention network 200 might compromise only nodes 201-1 through 201-N, and not gateway 202, and it will be clear to those skilled in the art, after reading this disclosure, how to make such embodiments.

Dynamic Host Configuration Protocol (DHCP) server 203 is a data-processing system that is capable of assigning a unique address to each node in ad-hoc-wireless network 200 (e.g., terminals 201-1 through 201-N, gateway 202, etc.), and of disseminating these addresses to the nodes, in accordance with the Dynamic Host Configuration Protocol (DHCP), in well-known fashion. As will be appreciated by those skilled in the art, although DHCP server 203 is depicted in FIG. 2 as communicating via a wireless communication link, in some other embodiments of the present invention DHCP server 203 might instead have a wired connection to another entity that acts as a wireless relay for DHCP server 203.

Non-multi-hop terminal 204 is a wireless telecommunications terminal that is capable of transmitting and receiving wireless point-to-point messages in well-known fashion, but that is not capable of participating as an intermediate node in a multi-hop route through multi-hop ad-hoc wireless network 200. The arrow pointing upward from terminal 204 indicates that the terminal is approaching multi-hop ad-hoc wireless network 200.

In accordance with the illustrative embodiment of the present invention, terminals 201-1 through 201-N, gateway 202, DHCP server 203, and terminal 204 communicate via an Institute of Electrical and Electronics Engineers (IEEE) 802.11 protocol in ad-hoc mode. As will be appreciated by those skilled in the art, in some other embodiments of the present invention the entities of network 200 might communicate via a different wireless protocol, such as Bluetooth, etc.

Figure 3:
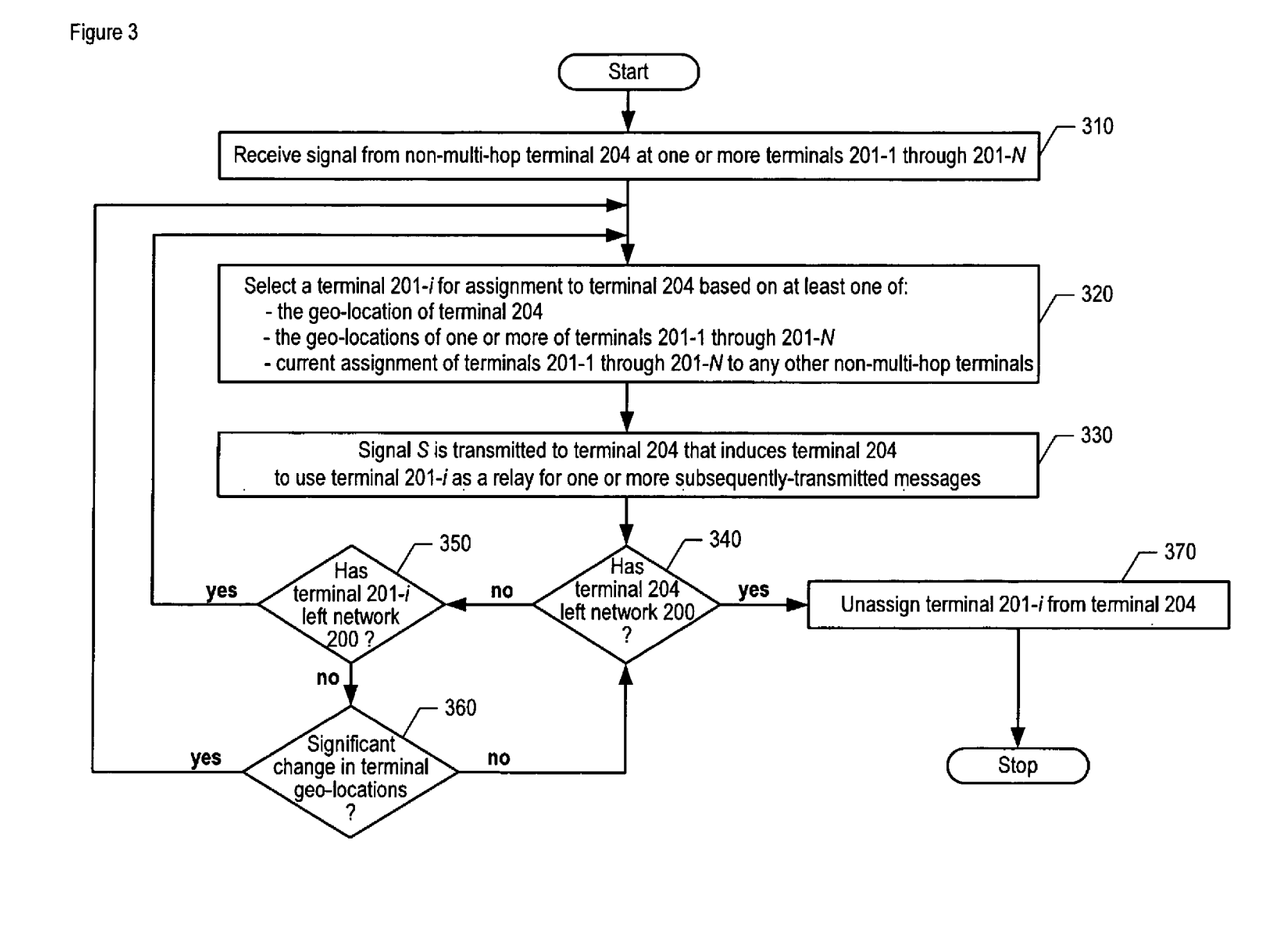
FIG. 3 depicts a flowchart of the salient tasks performed when non-multi-hop terminal 204 comes within range of multi-hop ad-hoc wireless network 200, in accordance with the illustrative embodiment of the present invention.

FIG. 3 depicts a flowchart of the salient tasks performed when non-multi-hop terminal 204 comes within range of multi-hop ad-hoc wireless network 200, in accordance with the illustrative embodiment of the present invention. It will be clear to those skilled in the art, after reading this disclosure, which tasks depicted in FIG. 3 can be performed simultaneously or in a different order than that depicted.

At task 310, one or more of multi-hop-capable terminals 201-1 through 201-N receive a signal from non-multi-hop terminal 204, in well-known fashion. As will be appreciated by those skilled in the art, this signal might be one that is normally transmitted by terminal 204 in accordance with a particular protocol (e.g., a Dynamic Host Configuration Protocol broadcast, an Address Resolution Protocol request, etc.).

At task 320, one of terminals 201-1 through 201-N, terminal 201-$i$, is selected to be assigned to terminal 204. In accordance with the illustrative embodiment, the selection is based on one or more of:

- the geo-location of terminal 204,
- the geo-locations of one or more of terminals 201-1 through 201-N,
- the respective signal strengths with which one or more of terminals 201-1 through 201-N receive terminal 204's transmitted signal,
- the signal strengths, as received at terminal 204, of signals transmitted by one or more of terminals 201-1 through 201-N, and
- the current assignment(s), if any, of terminals 201-1 through 201-N to any other non-multi-hop terminals in network 200 (not shown in FIG. 2).

In some embodiments, one or more of terminals 201-1 through 201-N might "advertise" their interest in being assigned to terminal 204, and terminal 204 selects one of these terminals. Alternatively, in some other embodiments terminals 201-1 through 201-N might choose among themselves which is assigned to terminal 204 via a distributed election algorithm.

As will be appreciated by those skilled in the art, the above selection criteria might be used in a variety of ways to select terminal 201-$i$. For example, task 320 might attempt to select the terminal that is closest to terminal 204 and that is not already assigned to another non-multi-hop terminal, or might seek to optimize some other metric based on these criteria.

As will further be appreciated by those skilled in the art, there are a variety of ways known in the art in which the geo-locations of 201-1 through 201-N and terminal 203 might be estimated and reported (e.g., based on transmission delays and triangulation, via Global Positioning System [GPS] receivers embedded in the terminals, etc.), and it will be clear to those skilled in the art, after reading this disclosure, how to make and use embodiments of the present invention that are capable of estimating the geo-locations of these terminals.

When terminal 201-$i$ is assigned to terminal 204 at task 320, terminal 201-$i$ is actually assigned to the ordered pair (terminal 204, ?), where '?' is a temporary wildcard for the destination of a message subsequently transmitted by terminal 204. The nature of this ordered pair and the subsequent instantiation of this wildcard will be clarified below in the description of FIG. 5.

At task 330, a signal S is transmitted to terminal 204 that induces terminal 204 to use terminal 201-$i$ as a relay for one or more of its subsequently-transmitted messages. In the illustrative embodiment, two mechanisms are advantageously employed for transmitting this signal in accordance with existing communication protocols: "proxy ARPing", a technique well-known in the art, where ARP refers to the Address Resolution Protocol; and transmitting successive Dynamic Host Configuration Protocol (DHCP) messages with changing gateway addresses. In proxy ARPing, terminal 204 broadcasts an Address Resolution Protocol (ARP) request. Terminal 201-$i$—and possibly one or more other terminals 201—announces to terminal 204, via an ARP response (i.e., signal S), that it (terminal 201-$i$) is the desired gateway. As a result, when terminal 204 subsequently has a message to transmit, it is induced to use the selected terminal 201-$i$ as a relay.

In the second mechanism, DHCP server 203 successively transmits DHCP messages to terminal 204, where each DHCP message might specify terminal 201-$i$ as the gateway, or might be updated by terminal 201-$i$, specifying itself (terminal 201-$i$) as the gateway—when appropriate—before transmitting the DHCP message to terminal 204. As in proxy ARPing, terminal 204 might select terminal 201-$i$ from a plurality of terminals that update DHCP messages in this manner. When the DHCP messages are transmitted sufficiently closely in time, the result is that when terminal 204 has a message to transmit to a destination outside of network 200, terminal 204 is induced to use terminal 201-$i$ as a relay for this message.

At task 340, the method branches based on whether terminal 204 is no longer in network 200 (e.g., terminal 204 has moved out of range of network 200, terminal 204 has been powered down, etc.). If terminal 204 has left network 200, execution continues at task 370, otherwise execution proceeds to task 350.

At task 350, the method branches based on whether terminal 201-$i$ is no longer in network 200. If terminal 201-$i$ has left network 200, execution continues back at task 320, otherwise execution proceeds to task 360.

At task 360, the method branches based on whether any of the selection criteria of task 320 have sufficiently changed to warrant reassigning a different multi-hop-capable terminal to terminal 204 instead of terminal 201-$i$. If not, execution continues back at task 340, otherwise execution continues back at task 320. As will be appreciated by those skilled in the art, the particular thresholds that are used to determine if selection criteria have sufficiently changed is an implementation design choice, and is likely best determined empirically for a particular deployment.

At task 370, terminal 201-$i$ is unassigned from terminal 204. After task 370, the method of FIG. 3 terminates.

Figure 4:
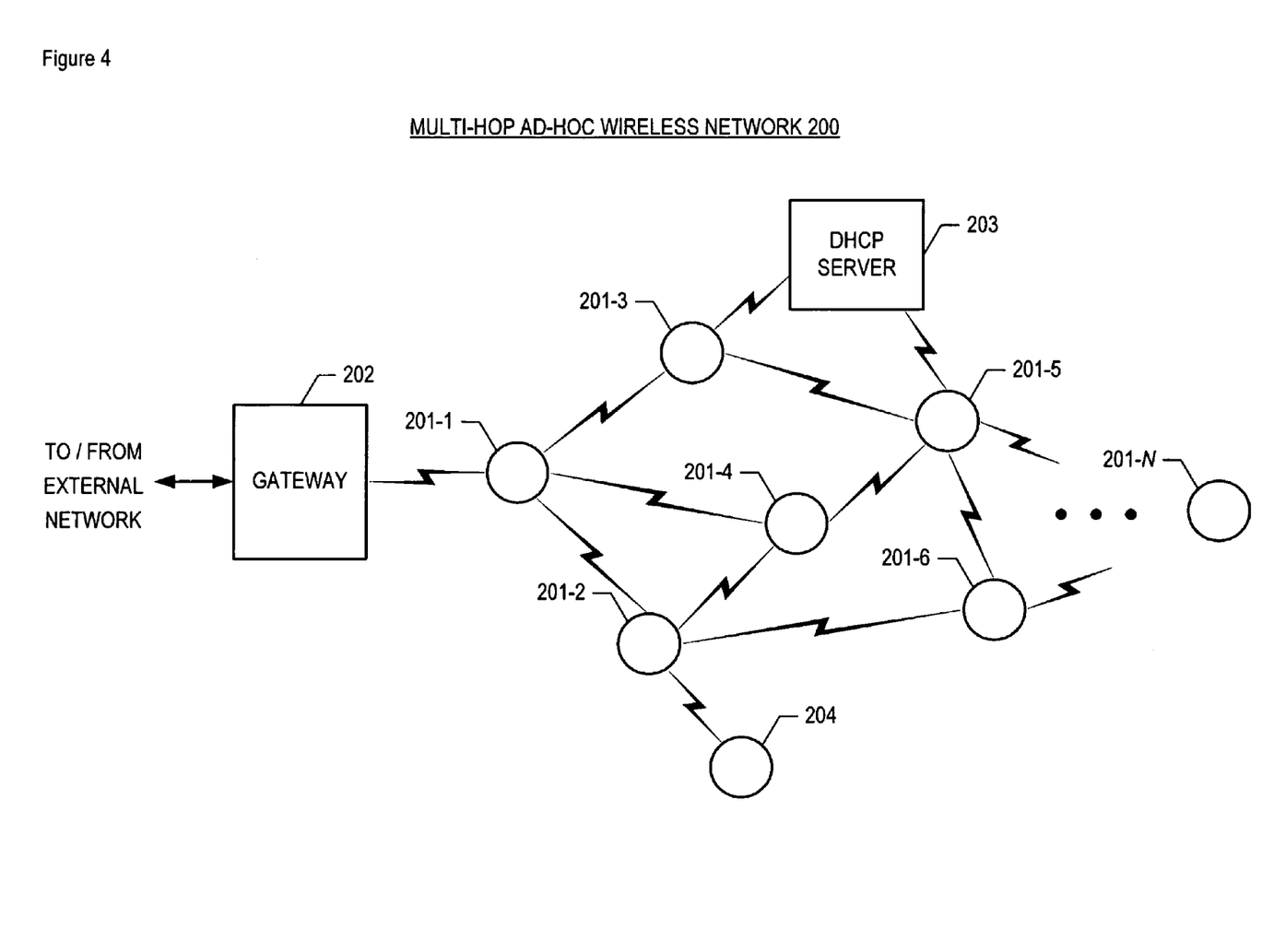
FIG. 4 depicts an illustrative topology for multi-hop ad-hoc wireless network 200 after the method of FIG. 3 has been performed, in accordance with the illustrative embodiment of the present invention.

FIG. 4 depicts an illustrative topology for multi-hop ad-hoc wireless network 200 after the method of FIG. 3 has been performed, in accordance with the illustrative embodiment of the present invention. As shown in FIG. 4, the method of FIG. 3 has assigned multi-hop-capable terminal 201-2 to terminal 204.

Figure 5:
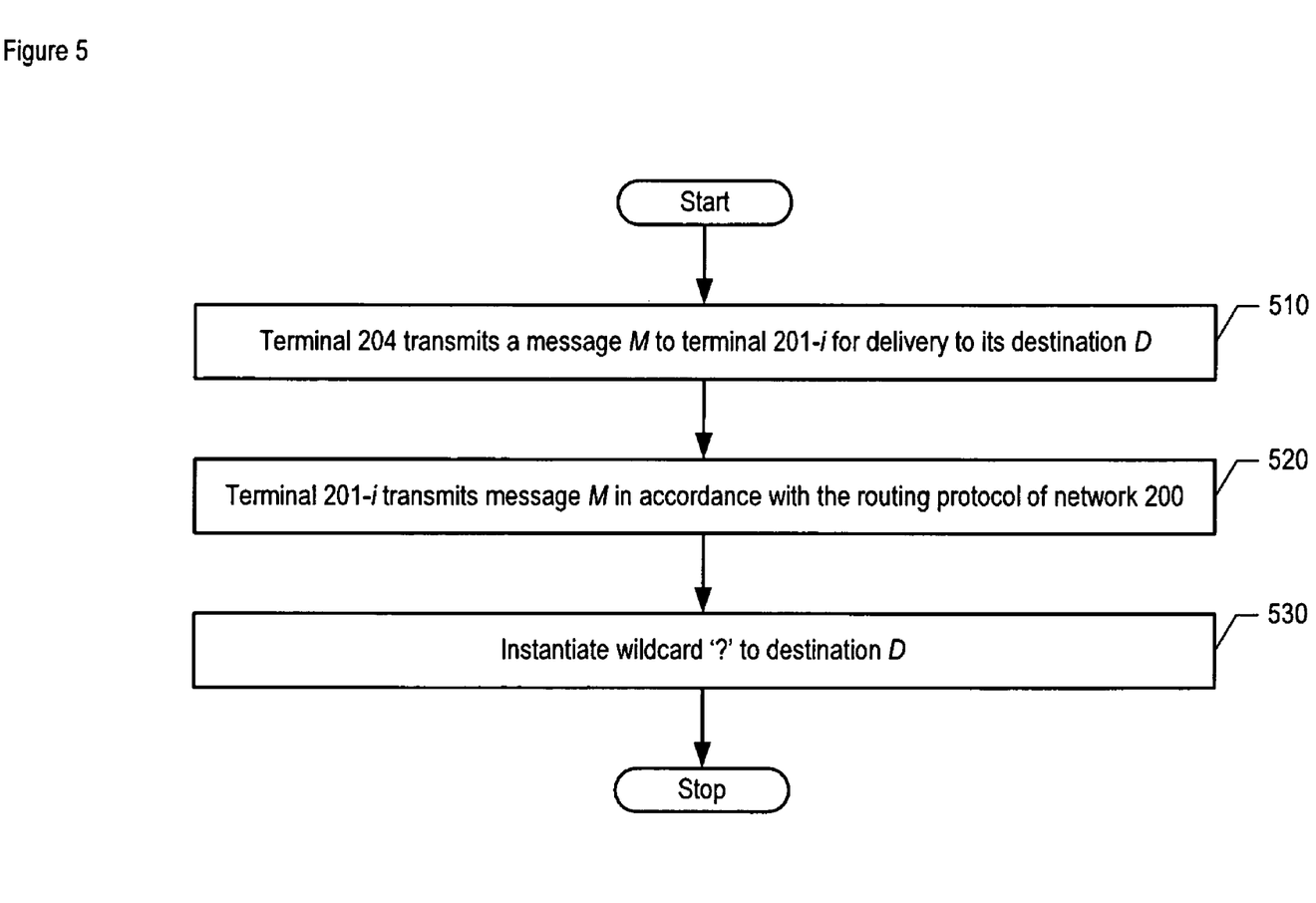
FIG. 5 depicts a flowchart of the salient tasks performed when non-multi-hop terminal 204 has a message to transmit after the assignment of multi-hop-capable terminal 201-$i$, in accordance with the illustrative embodiment of the present invention.

FIG. 5 depicts a flowchart of the salient tasks performed when non-multi-hop terminal 204 has a message to transmit after the assignment of multi-hop-capable terminal 201-$i$, in accordance with the illustrative embodiment of the present invention. It will be clear to those skilled in the art, after reading this disclosure, which tasks depicted in FIG. 5 can be performed simultaneously or in a different order than that depicted.

At task 510, terminal 204 transmits a message M to terminal 201-$i$ for delivery to its destination D, in well-known fashion.

At task 520, terminal 201-$i$ transmits message M in accordance with the routing protocol of network 200, in well-known fashion. (As will be appreciated by those skilled in the art, destination D might be another terminal in network 200, or might be external to network 200, in which case the routing protocol will route the message via gateway 202 in well-known fashion.)

At task 530, wildcard '?' is instantiated to destination D. The effect of this is that terminal 201-*i* henceforth acts as a relay for all subsequent messages from terminal 204 that are directed to destination D. If terminal 204 subsequently has a message to transmit to some other destination, a different multi-hop-capable terminal might be assigned to act as a relay, as is now described with respect to FIG. 6.

Figure 6:
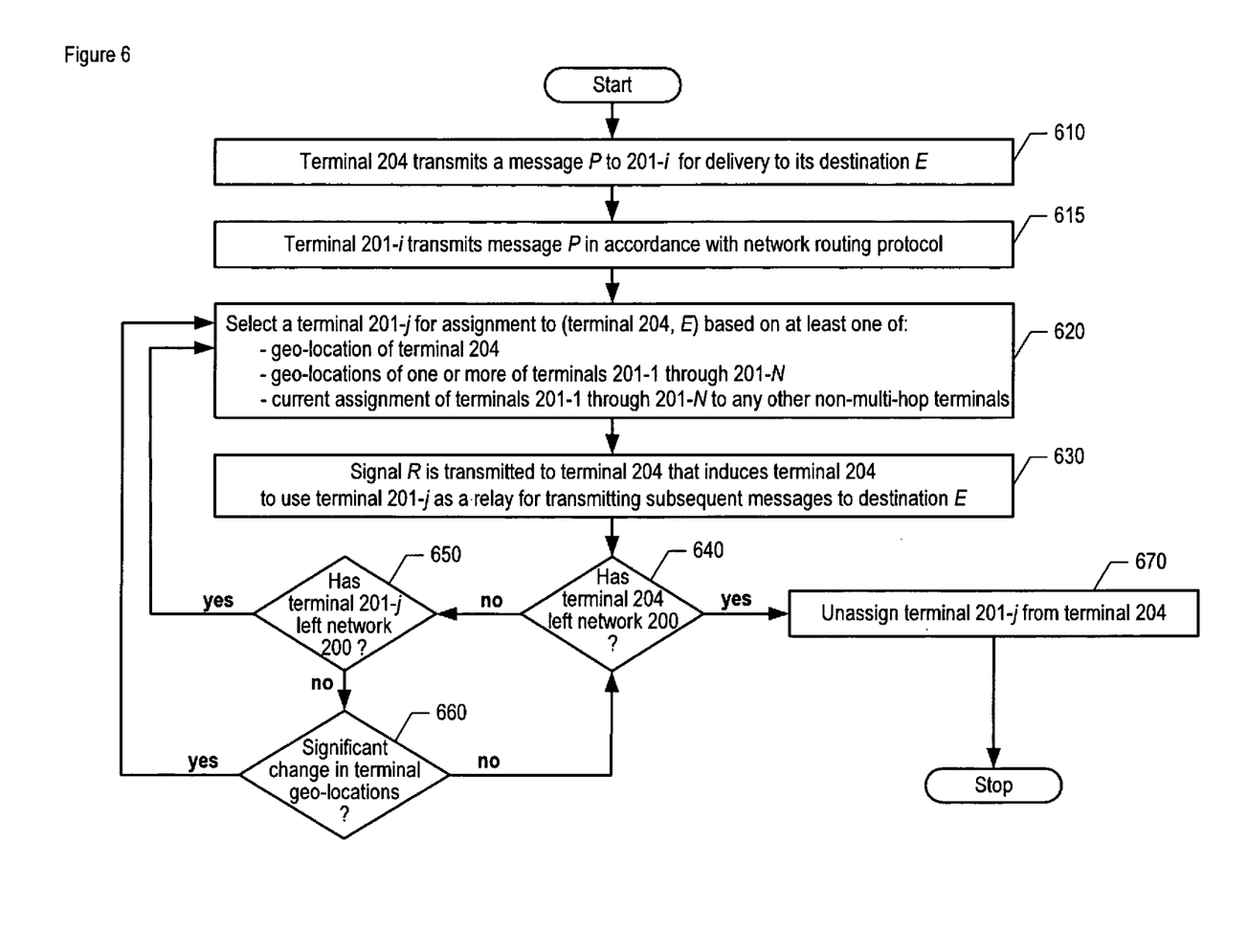
FIG. 6 depicts a flowchart of the salient tasks performed when non-multi-hop terminal 204 has a subsequent message to transmit that is directed to a different destination, in accordance with the illustrative embodiment of the present invention.

FIG. 6 depicts a flowchart of the salient tasks performed when non-multi-hop terminal 204 has a subsequent message to transmit that is directed to a destination other than D, in accordance with the illustrative embodiment of the present invention. It will be clear to those skilled in the art, after reading this disclosure, which tasks depicted in FIG. 6 can be performed simultaneously or in a different order than that depicted.

At task 610, terminal 204 transmits a message P to terminal 201-*i* for delivery to its destination E, in well-known fashion.

At task 615, terminal 201-*i* transmits message P in accordance with the routing protocol of network 200, in well-known fashion.

At task 620, one of terminals 201-1 through 201-N, terminal 201-*j*, is selected to be assigned to (terminal 204, E), as in task 320 of FIG. 3.

At task 630, a signal R is transmitted to terminal 204 that induces terminal 204 to use terminal 201-*j* as a relay for any subsequent messages that terminal 204 transmits to destination E. In the illustrative embodiment, one or both of the two mechanisms described above and with respect to task 330 are advantageously employed for transmitting signal R.

At task 640, the method branches based on whether terminal 204 is no longer in network 200 (e.g., terminal 204 has moved out of range of network 200, terminal 204 has been powered down, etc.). If terminal 204 has left network 200, execution continues at task 670, otherwise execution proceeds to task 650.

At task 650, the method branches based on whether terminal 201-*i* is no longer in network 200. If terminal 201-*i* has left network 200, execution continues back at task 620, otherwise execution proceeds to task 660.

At task 660, the method branches based on whether any terminal geo-locations have sufficiently changed to warrant reassigning a different multi-hop-capable terminal to terminal 204 instead of terminal 201-*i*. If not, execution continues back at task 340, otherwise execution continues back at task 620. As described above and with respect to task 360, the particular threshold that is used is a design choice that is likely best determined empirically for a particular deployment.

At task 670, terminal 201-*i* is unassigned from terminal 204. After task 670, the method of FIG. 6 terminates.

Figure 7:
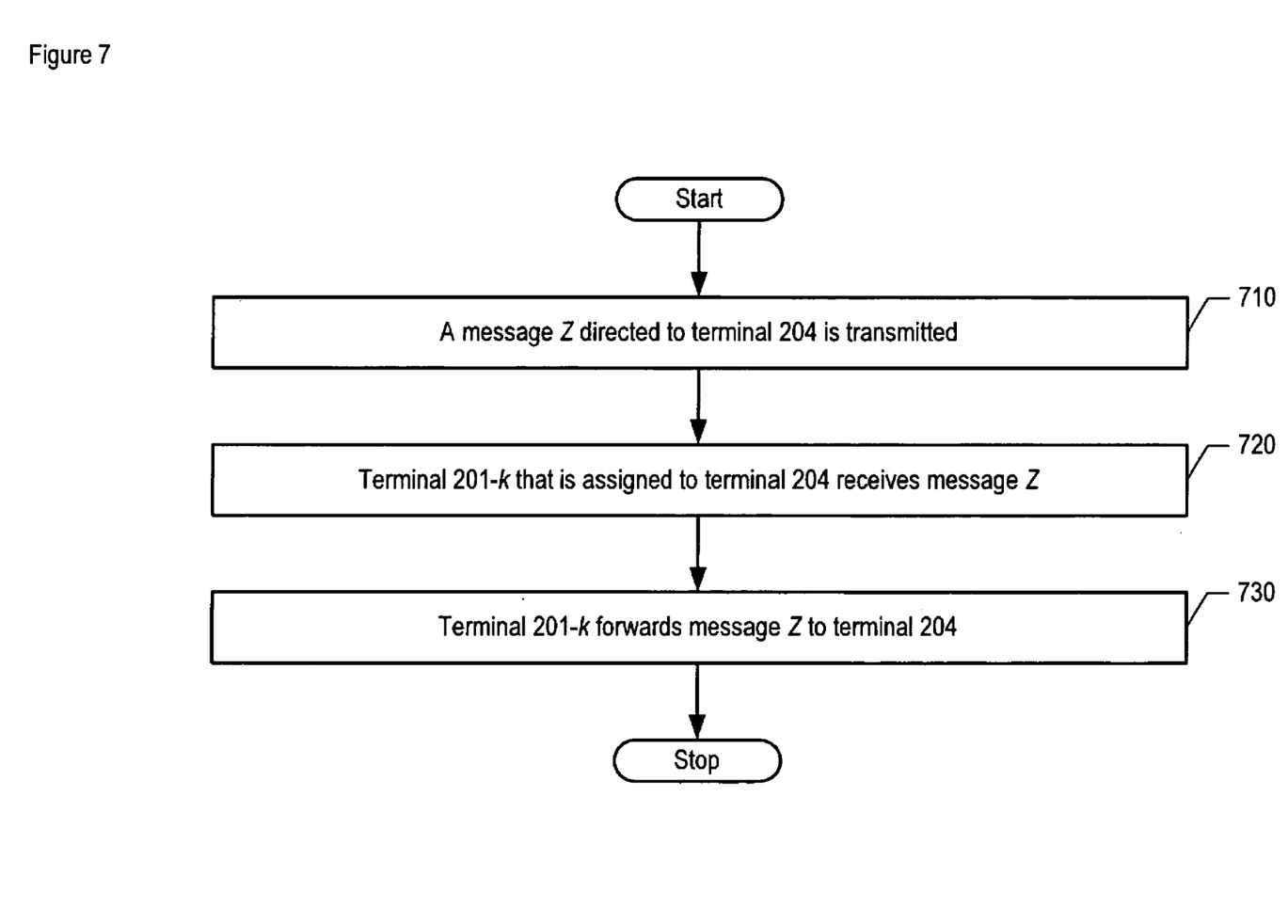
FIG. 7 depicts a flowchart of the salient tasks performed when a message is directed to non-multi-hop terminal 204, in accordance with the illustrative embodiment of the present invention.

FIG. 7 depicts a flowchart of the salient tasks performed when a message is directed to non-multi-hop terminal 204, in accordance with the illustrative embodiment of the present invention. It will be clear to those skilled in the art, after reading this disclosure, which tasks depicted in FIG. 7 can be performed simultaneously or in a different order than that depicted.

At task 710, a message Z is transmitted that is directed to terminal 204. As will be appreciated by those skilled in the art, message Z might be transmitted by one of multi-hop-capable terminals 201-1 through 201-N, or by a terminal outside of network 200, or by another non-multi-hop terminal in network 200 (not shown in FIG. 2 or 4).

At task 720, the routing of message Z through network 200 results in the receipt of message Z at a multi-hop-capable terminal 201-*k* that could be assigned to terminal 204, in well-known fashion. As will be appreciated by those skilled in the art, incoming messages to terminal 204 might arrive via any terminal 201 that has advertised itself as "capable" to reach terminal 204, and not necessarily the terminal that was used as a relay for transmission.

At task 730, terminal 201-*k* forwards message Z to terminal 204. After task 730, the method of FIG. 7 terminates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    receiving at one or more of a plurality of wireless telecommunications terminals a signal from a wireless telecommunications terminal W, wherein said plurality of wireless telecommunications terminals belong to the same ad-hoc wireless network and are capable of participating as intermediary nodes in multi-hop routes through said ad-hoc wireless network, and wherein said wireless telecommunications terminal W is incapable of participating as an intermediate node in a multi-hop route through said ad-hoc wireless network and wherein said ad-hoc wireless network comprises a gateway; and
    transmitting, in response to said signal, a series of messages to said wireless telecommunications terminal W, wherein each of said messages of said series is a Dynamic Host Configuration Protocol message that is transmitted by a Dynamic Host Configuration Protocol server, and wherein each of said series of messages specifies a respective address for said gateway, and wherein each of said series of messages is transmitted no more than $\Delta$ seconds after the transmission of the prior message, and wherein $\Delta>0$.

2. The method of claim 1 further comprising broadcasting in said ad-hoc wireless network an Address Resolution Protocol message from said wireless telecommunications terminal W.

3. The method of claim 1 wherein said series of messages induces said wireless telecommunications terminal W to use one of said plurality of wireless telecommunications terminals as a relay for transmitting a message to a destination outside said ad-hoc wireless network.

4. The method of claim 1 wherein at least one of said series of messages specifies the address of a wireless telecommunications terminal T of said ad-hoc network as the address for said gateway.

5. The method of claim 4 wherein wireless telecommunications terminal T is selected from said plurality of wireless telecommunications terminals.

6. The method of claim 1 wherein at least one message M of said series of messages is updated by a wireless telecommunications terminal T of said ad-hoc network before message M is received by wireless telecommunications terminal W.

7. The method of claim 6 wherein wireless telecommunications terminal T updates message M so that message M specifies the address of wireless telecommunications terminal T as the address for said gateway.

8. The method of claim 6 wherein wireless telecommunications terminal T is selected from said plurality of wireless telecommunications terminals.

9. The method of claim 6 wherein wireless telecommunications terminal T is selected from a subset of said plurality of wireless telecommunications terminals that are capable of updating Dynamic Host Configuration Protocol messages.

10. An apparatus comprising:
- a receiver for receiving a first signal that indicates that a second signal has been received at one or more of a plurality of wireless telecommunications terminals from a wireless telecommunications terminal W, wherein said plurality of wireless telecommunications terminals belong to the same ad-hoc wireless network and are capable of participating as intermediary nodes in multi-hop routes through said ad-hoc wireless network, and wherein said wireless telecommunications terminal W is incapable of participating as an intermediate node in a multi-hop route through said ad-hoc wireless network and wherein said ad-hoc wireless network comprises a gateway; and
- a transmitter for transmitting, in response to said first signal, a series of Dynamic Host Configuration Protocol messages to said wireless telecommunications terminal W, wherein each of said series of messages specifies a respective address for said gateway, and wherein each of said series of messages is transmitted no more than $\Delta$ seconds after the transmission of the prior message, and wherein $\Delta > 0$.

11. The apparatus of claim 10 wherein said apparatus is a Dynamic Host Configuration Protocol server.

12. The apparatus of claim 10 wherein said series of messages induces said wireless telecommunications terminal W to use one of said plurality of wireless telecommunications terminals as a relay for transmitting a message to a destination outside said ad-hoc wireless network.

13. The apparatus of claim 10 wherein at least one of said series of messages specifies the address of a wireless telecommunications terminal T of said ad-hoc network as the address for said gateway.

14. The apparatus of claim 13 wherein wireless telecommunications terminal T is selected from said plurality of wireless telecommunications terminals.

15. The apparatus of claim 10 wherein at least one message M of said series of messages is updated by a wireless telecommunications terminal T of said ad-hoc network before message M is received by wireless telecommunications terminal W.

16. The apparatus of claim 15 wherein wireless telecommunications terminal T updates message M so that message M specifies the address of wireless telecommunications terminal T as the address for said gateway.

17. The apparatus of claim 15 wherein wireless telecommunications terminal T is selected from said plurality of wireless telecommunications terminals.

18. The apparatus of claim 15 wherein wireless telecommunications terminal T is selected from a subset of said plurality of wireless telecommunications terminals that are capable of updating Dynamic Host Configuration Protocol messages.

* * * * *

UNITED STATES PATENT AND TRADEMARK OFFICE
CERTIFICATE OF CORRECTION

PATENT NO. : 8,009,615 B2  Page 1 of 1
APPLICATION NO. : 11/937902
DATED : August 30, 2011
INVENTOR(S) : Krishnakumar et al.

It is certified that error appears in the above-identified patent and that said Letters Patent is hereby corrected as shown below:

Column 9, line 21, "A" should read -- $\Delta$ --.

Signed and Sealed this
Sixth Day of December, 2011

David J. Kappos
*Director of the United States Patent and Trademark Office*